United States Patent
Schmitz

(10) Patent No.: US 6,913,248 B1
(45) Date of Patent: Jul. 5, 2005

(54) VEHICLE LIFTING AND WHEEL REMOVAL COMBINATION SYSTEM

(76) Inventor: Michael J. Schmitz, 22001 125th St. East, Sumner, WA (US) 98390

( * ) Notice: Subject to any disclaimer, the term of this patent is extended or adjusted under 35 U.S.C. 154(b) by 0 days.

(21) Appl. No.: 10/462,902

(22) Filed: Jun. 18, 2003

(51) Int. Cl.[7] .............................. B66F 3/24; B60S 9/02
(52) U.S. Cl. ........................ 254/423; 280/766.1; 7/100
(58) Field of Search .............................. 254/423, 93 R, 254/93 H, 45, 418, 89 H, 93 VA; 280/766.1; 7/100

(56) References Cited

U.S. PATENT DOCUMENTS

| | | | |
|---|---|---|---|
| 4,993,688 A | | 2/1991 | Mueller et al. |
| 5,465,940 A | | 11/1995 | Guzman et al. |
| 5,713,560 A | | 2/1998 | Guarino |
| 5,722,641 A | * | 3/1998 | Martin et al. ............... 254/423 |
| 5,765,810 A | | 6/1998 | Mattera |
| 5,897,103 A | * | 4/1999 | Griffioen et al. ......... 254/134.4 |
| 5,931,500 A | | 8/1999 | Dagnese |
| 6,079,742 A | | 6/2000 | Spence |

* cited by examiner

Primary Examiner—Debra Meislin

(57) ABSTRACT

A vehicle lifting and wheel removal combination system includes a hydraulic pump mounted on a vehicle. Each of a plurality of hydraulic jacks is fluidly coupled to the hydraulic pump. Each of the hydraulic jacks is mounted to a frame of the vehicle. A plurality of actuators is operationally coupled to the hydraulic pump for selectively positioning each of the hydraulic jacks in an extended position or a retracted position. A plurality of air compressors is mounted to the vehicle and each is operationally coupled to the power supply. Each of a plurality of air lines is fluidly coupled to one of the air compressors. Each of the air lines has a free end having a first mating portion coupled thereto. A pneumatic impact gun for removing lug nuts has a second mating portion for selectively coupling to one of the first mating portions of the air lines.

5 Claims, 3 Drawing Sheets

VEHICLE LIFTING AND WHEEL REMOVAL COMBINATION SYSTEM

BACKGROUND OF THE INVENTION

1. Field of the Invention

The present invention relates to car lifting devices and more particularly pertains to a new car lifting device for selectively lifting a portion of a vehicle.

2. Description of the Prior Art

The use of car lifting devices is known in the prior art. While these devices fulfill their respective, particular objectives and requirements, the need remains for a device that not only lifts the vehicle but also provides a method for removing the wheels of a vehicle.

SUMMARY OF THE INVENTION

The present invention meets the needs presented above by providing hydraulic jacks for selectively lifting a frame of a vehicle away from a ground surface and also includes air lines for supplying air to an impact gun so that the lug nuts of a wheel may be removed.

To this end, the present invention generally comprises a hydraulic pump mounted on a vehicle. The hydraulic pump is operationally coupled to a power supply of the vehicle. Each of a plurality of hydraulic jacks is fluidly coupled to the hydraulic pump such that the hydraulic pump may independently actuate each of the hydraulic jacks. Each of the hydraulic jacks is mounted to a frame of the vehicle such that a height of each of the hydraulic jacks may be selectively extended downwardly away from the frame or retracted toward the frame. A plurality of actuators is operationally coupled to the hydraulic pump for selectively positioning each of the hydraulic jacks in an extended position or a retracted position independently of each other. A plurality of air compressors is mounted to the vehicle and each is operationally coupled to the power supply. Each of a plurality of air lines is fluidly coupled to one of the air compressors. Each of the air lines has a free end having a first mating portion coupled thereto. A pneumatic impact gun for removing lug nuts has a second mating portion for selectively coupling to one of the first mating portions of the air lines.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
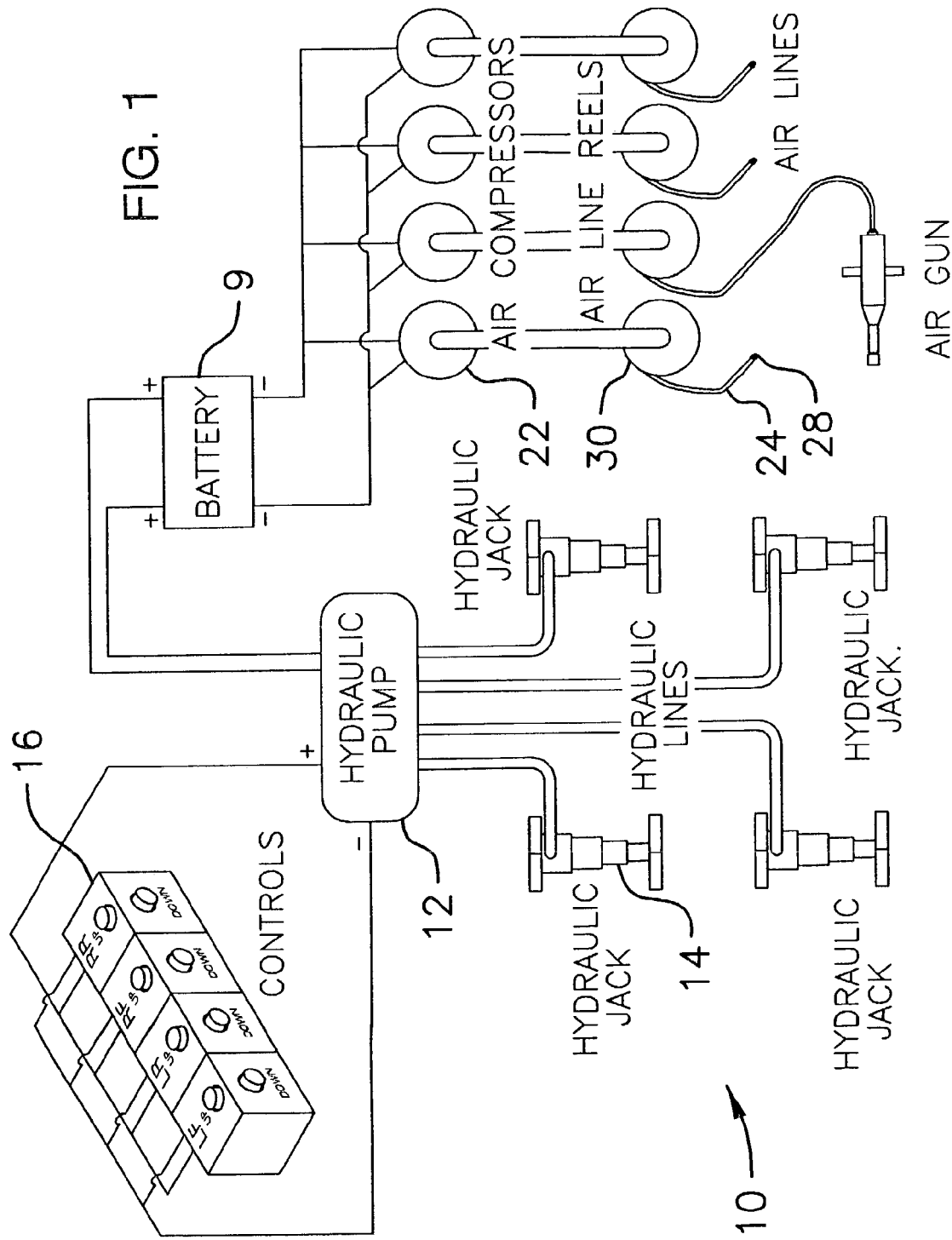
FIG. 1 is a schematic view of a vehicle lifting and wheel removal combination system according to the present invention.
Figure 2:
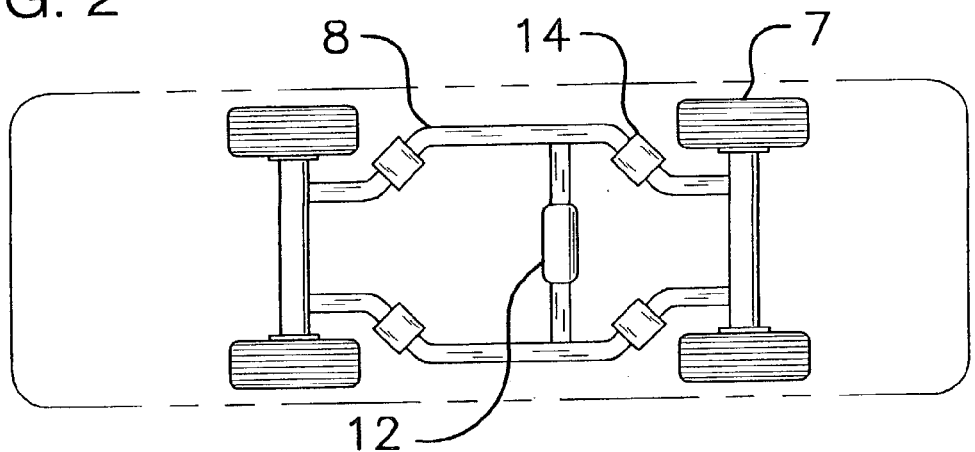
FIG. 2 is a schematic bottom view of the present invention.
Figure 3:
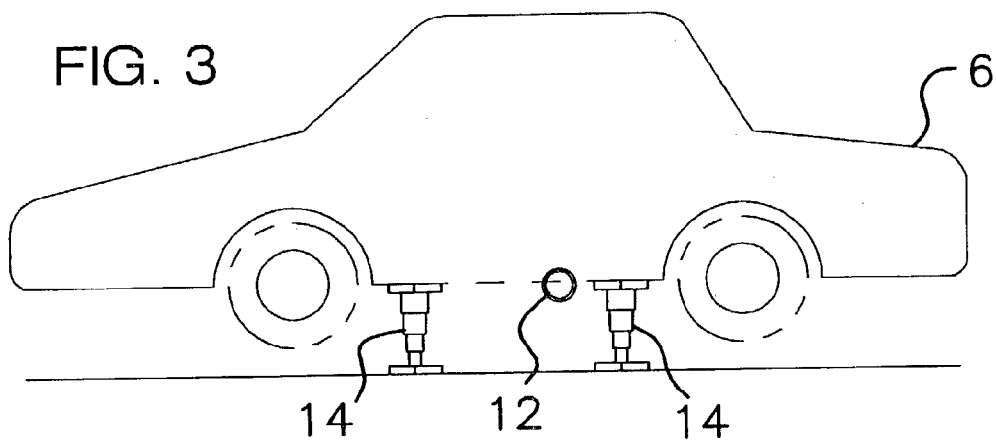
FIG. 3 is a schematic side view of the present invention.
Figure 4:
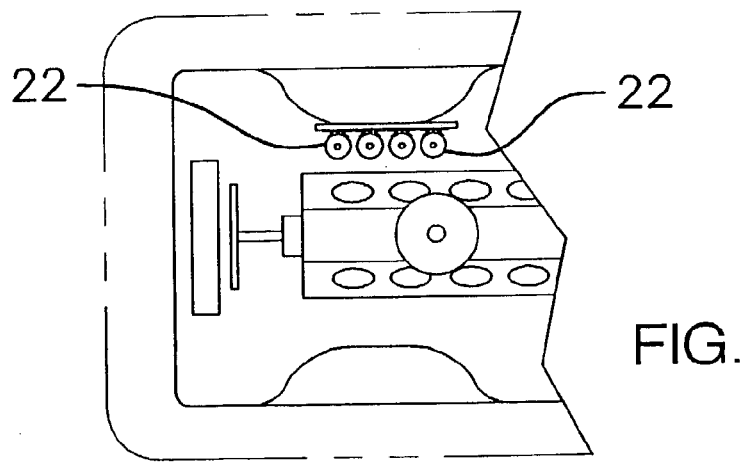
FIG. 4 is a schematic top view of the present invention.
Figure 5:
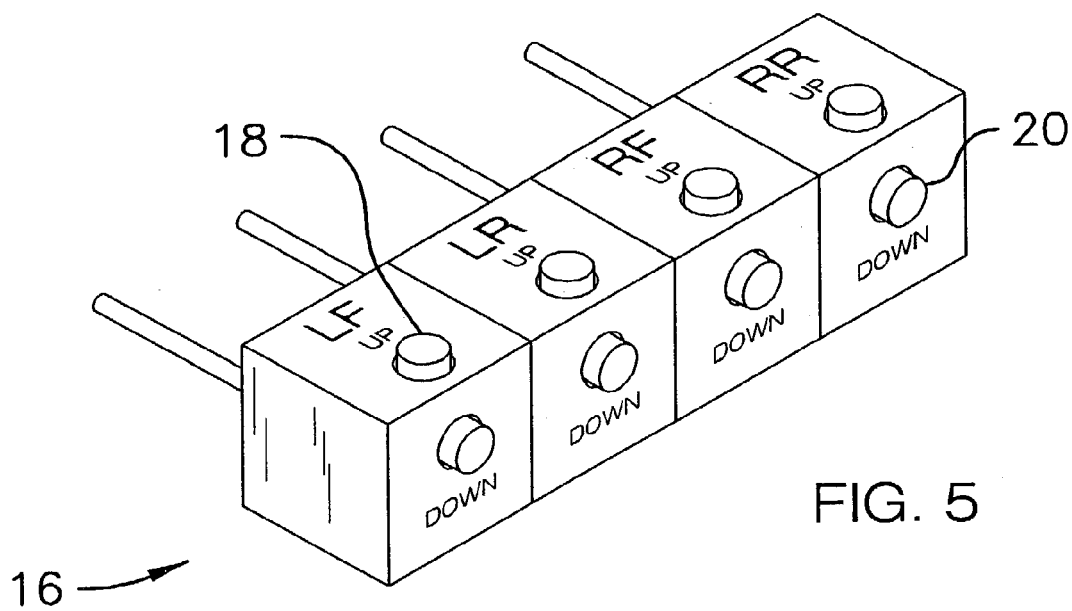
FIG. 5 is a schematic perspective view of actuators of the present invention.
Figure 6:
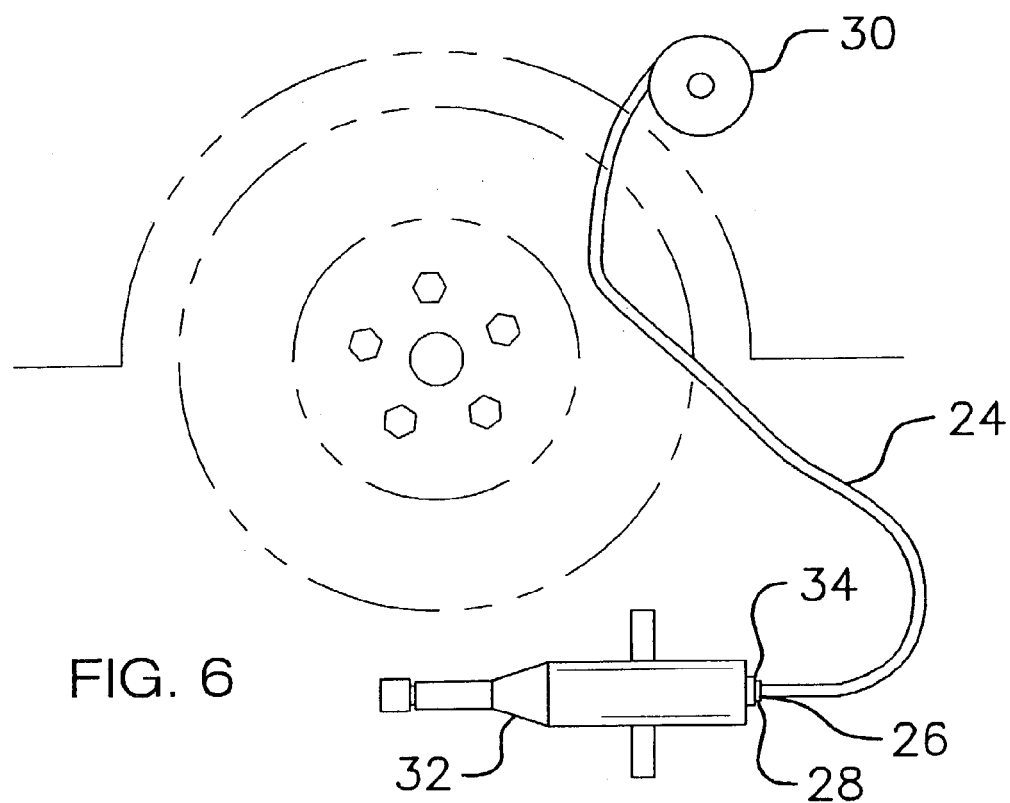
FIG. 6 is a schematic side view of the present invention.

With reference now to the drawings, and in particular to FIGS. 1 through 6 thereof, a new car lifting device embodying the principles and concepts of the present invention and generally designated by the reference numeral 10 will be described.

As best illustrated in FIGS. 1 through 6, the vehicle lifting and wheel removal combination system 10 is designed to lift a vehicle 6 and aid in removal of wheels 7 of the vehicle. The vehicle 6 is conventional and includes a frame 8 having four wheels 7 mechanically coupled thereto.

The system 10 includes a hydraulic pump 12 mounted on the vehicle 6. The hydraulic pump 12 is operationally coupled to a power supply 9 of the vehicle 6. Each of a plurality of hydraulic jacks 14 is fluidly coupled to the hydraulic pump 12 such that the hydraulic pump 12 may independently actuate each of the hydraulic jacks 14. Each of the hydraulic jacks 14 is mounted to the frame 8 of the vehicle 6 such that a height of each of the hydraulic jacks 14 may be selectively extended downwardly away from the frame 8 or retracted toward the frame 8. A respective retracted position and an extended position are defined wherein each of the hydraulic jacks 14 has a height of greater than six inches in the extended position and a height of less than six inches is the retracted position. The hydraulic jacks 14 lift the frame 8 upwardly away from a ground surface when they are in the extended position. The plurality of hydraulic jacks 14 preferably includes four hydraulic jacks. Each of the four hydraulic jacks 14 is positioned generally adjacent to one of four wheels 7 of the vehicle 6.

A plurality of actuators 16 is operationally coupled to the hydraulic pump 12 for selectively positioning each of the hydraulic jacks 14 in the extended position or the retracted position independently of each other. There is preferably a pair of actuators 16 for each of the hydraulic jacks 14. Each of the pair of actuators includes an extending actuator 18 and a retracting actuator 20.

A plurality of air compressors 22 is mounted to the vehicle 6 and each is operationally coupled to the power supply 9. Each of a plurality of air lines 24 is fluidly coupled to one of the air compressors 22. The air lines 24 each have a free end 26 having a first mating portion 28 coupled thereto. Each of the free ends 26 is positioned generally adjacent to one of the four wheels 7. Ideally, the air lines 24 are each mounted on retracting reels 30 so that they may be selectively extended outwardly away from the reels 30. Ideally, the reels 30 are mounted on an inner surface of the wheel wells adjacent to the wheel 7. A conventional pneumatic impact gun 32 for removing lug nuts includes a second mating portion 34 for selectively coupling to one of the first mating portions 28 of the air lines so that the corresponding air compressor 22 is fluidly coupled to the impact gun 32. The first 28 and second 34 mating portions may be conventional valve structures.

In use, a user of the system 10 may selectively lift a portion of the vehicle 6 in order to perform an oil change, work on the engine or remove one or more wheels 7. The air lines 24 are provided to supply air to the impact gun 32 for the purpose of aiding a person in removing lug nuts of the wheels 7. The air lines 24 are positioned so that they are easily accessible when needed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for lifting a vehicle and for providing means for removal of wheels positioned on the vehicle, the vehicle including a frame having four wheels mechanically coupled thereto, said system including:
   a hydraulic pump mounted on said vehicle, said hydraulic pump being operationally coupled to a power supply of the vehicle;
   a plurality of hydraulic jacks, each of said hydraulic jacks being fluidly coupled to said hydraulic pump such that said hydraulic pump may independently actuate each of said hydraulic jacks, each of said hydraulic jacks being mounted to the frame of the vehicle such that a height of each of said hydraulic jacks may be selectively extended downwardly away from said frame or retracted toward said frame;
   a plurality of actuators being operationally coupled to said hydraulic pump for selectively positioning each of said hydraulic jacks in an extended position or a retracted position independently of each other;
   a plurality of air compressors being mounted to the vehicle and being operationally coupled to the power supply;
   a plurality of air lines, each of said air lines being fluidly coupled to one of said air compressors, each of said air lines having a free end having a first mating portion coupled thereto, each of said free ends of said air lines being positioned generally adjacent to one of the four wheels of the vehicle; and
   a pneumatic impact gun for removing lug nuts having a second mating portion for selectively coupling to one of said first mating portions of said air lines.

2. The system of claim 1, wherein said plurality of hydraulic jacks including four hydraulic jacks, each of said four hydraulic jacks being positioned generally adjacent to one of the four wheels of the vehicle.

3. The system of claim 1, wherein each of said hydraulic jacks having a height of greater than six inches in said extended position and a height of less than six inches is said retracted position.

4. The system of claim 1, wherein there are a pair of actuators for each of said hydraulic jacks, each of said pair of actuators including a extending actuator and a retracting actuator.

5. A vehicle lift and tire removal system comprising:
   a vehicle including a frame having four wheels mechanically coupled thereto;
   a hydraulic pump mounted on said vehicle, said hydraulic pump being operationally coupled to a power supply of the vehicle;
   a plurality of hydraulic jacks, each of said hydraulic jacks being fluidly coupled to said hydraulic pump such that said hydraulic pump may independently actuate each of said hydraulic jacks, each of said hydraulic jacks being mounted to the frame of the vehicle such that a height of each of said hydraulic jacks may be selectively extended downwardly away from said frame or retracted toward said frame, wherein a respective retracted position and an extended position are defined, said plurality of hydraulic jacks including four hydraulic jacks, each of said four hydraulic jacks being positioned generally adjacent to one of the four wheels of the vehicle, each of said hydraulic jacks having a height of greater than six inches in said extended position and a height of less than six inches is said retracted position;
   a plurality of actuators being operationally coupled to said hydraulic pump for selectively positioning each of said hydraulic jacks in said extended position or said retracted position independently of each other, wherein there are a pair of actuators for each of said hydraulic jacks, each of said pair of actuators including a extending actuator and a retracting actuator;
   a plurality of air compressors being mounted to the vehicle and being operationally coupled to the power supply;
   a plurality of air lines, each of said air lines being fluidly coupled to one of said air compressors, each of said air lines having a free end having a first mating portion coupled thereto, each of said free ends being positioned generally adjacent to one of the four wheels; and
   a pneumatic impact gun for removing lug nuts having a second mating portion for selectively coupling to one of said first mating portions of said air lines.

* * * * *